(12) United States Patent
Bergmann

(10) Patent No.: US 6,321,785 B1
(45) Date of Patent: Nov. 27, 2001

(54) SANITARY PROXIMITY VALVING

(75) Inventor: Konrad Bergmann, Schweich (DE)

(73) Assignee: Ideal-Standard GmbH, Bonn (DE)

( * ) Notice: Subject to any disclaimer, the term of this patent is extended or adjusted under 35 U.S.C. 154(b) by 0 days.

(21) Appl. No.: 09/319,251

(22) PCT Filed: Dec. 9, 1997

(86) PCT No.: PCT/EP97/06867

§ 371 Date: Jun. 9, 1999

§ 102(e) Date: Jun. 9, 1999

(87) PCT Pub. No.: WO98/26134

PCT Pub. Date: Jun. 18, 1998

(30) Foreign Application Priority Data

Dec. 10, 1996 (DE) ............................................. 196 51 132

(51) Int. Cl.[7] .............................. E03C 1/05; F16K 31/02
(52) U.S. Cl. .......................... 137/606; 251/129.04; 4/623
(58) Field of Search ................................... 137/606, 605, 137/607, 624.11, 624.12; 4/623; 251/129.04

(56) References Cited

U.S. PATENT DOCUMENTS

| 3,415,278 | 12/1968 | Yamamoto et al. | |
|---|---|---|---|
| 5,694,653 | * 12/1997 | Harald | 4/623 |
| 5,855,356 | * 1/1999 | Fait | 251/129.04 |
| 5,868,311 | * 2/1999 | Cretu-Petra | 251/129.04 X |
| 6,019,130 | * 2/2000 | Rump | 251/129.04 X |

FOREIGN PATENT DOCUMENTS

| 32 12 468 | 10/1983 | (DE) . |
|---|---|---|
| 91 11 577 | 11/1992 | (DE) . |
| 92 11 188 | 9/1993 | (DE) . |
| 85 12 039 | 7/1994 | (DE) . |
| 2195763 | 4/1988 | (GB) . |
| WO 89/09312 | 10/1989 | (WO) . |
| WO 94/00645 | 1/1994 | (WO) . |
| WO 96/14477 | 5/1996 | (WO) . |

* cited by examiner

*Primary Examiner*—Kevin Lee
(74) *Attorney, Agent, or Firm*—Nixon Peabody LLP; David S. Safran

(57) ABSTRACT

The invention relates to a sanitary proximity valving (1) having an associated control device (8) with a sensor device (9) and a valve device (10) coupled with the control device (8), whereby the control device (8), after detection of a signal by the sensor device (9), activates the valve device (10) to release water. The aim of the invention is to provide a sanitary proximity valving (1) which can be used also in the private sphere without major inconvenience, and is thus characterized in that the control device (8), after detection of a signal from one side, activates the valve device (10) to release cold water, whilst the control device (8), after detection of a signal from the other side, activates the valve device (10) to release warmer water.

26 Claims, 3 Drawing Sheets

SANITARY PROXIMITY VALVING

BACKGROUND OF THE INVENTION

1. Field of the Invention

The invention relates to a sanitary proximity fixture with an assigned control means which has a sensor means and a valve means which is coupled to the control means, after acquisition of a signal by the sensor means the control means triggering the valve means to release the water.

2. Description of Related Art

A proximity fixture of the initially mentioned type is already known from practice. The known proximity fixtures which are used in the industrial and public domain, compared to manually actuated fixtures, have various advantages of use which are also of interest in the private domain, specifically contactless operation saving of energy and water easy cleaning Other advantages prevail only in the commercial and industrial domain, specifically security against vandalism saving of water by autoclosure after a given time interval prevention of infections.

Although proximity fixtures have been in commercial and industrial use for a long time, they are not common in the private domain. One of the reasons for the fact that proximity fixtures have not be able to prevail to date in the private domain is the comparatively poor handling when warm and cold water are required in alternation. Conventional proximity fixtures for this reason have a switching mechanism which can be manually actuated and must be switched by hand, again neutralizing the advantages of contactless turning-off. The operation of switching requires more time than for example in a lever mixer.

In addition, in the private domain the private user often requires operating functions which cannot be performed with the known proximity fittings, for example the possibility of choosing a longer running time for the water for the conventional autoclosing function or being able to turn the fixture off entirely. In addition there is a system-induced defect of proximity fixtures, regardless of whether they are being used in the commercial and industrial or private domain, in that their operation is often not reliable enough since the sensor means can be disrupted by dirt or by other external effects. Finally, changes of electrical components can lead to malfunctions.

SUMMARY OF THE INVENTION

The object of this invention is to make available a proximity fixture of the initially mentioned type which meets the requirements for use which are conventional in the private domain and moreover works reliably and without malfunctions.

This object is achieved in accordance with the invention in a sanitary proximity fixture of the initially mentioned type in that the control means, after acquisition of a signal from one side, triggers the valve means for release of colder water, while the control means, after acquisition of a signal from the other side, triggers the valve means for release of warmer water. As a result, the invention makes available direction recognition of the control and sensor means which is used to connect either cold water or hot or warm water. Conventionally when a signal is acquired from the right the cold water valve is triggered, while when a signal is acquired from the left, hot or warm water is connected. The warm water is premixed to the warm temperature most often used in the private domain, for which known mechanical thermostatic mixer technologies can be used in the valve means.

Other features, advantages and possible applications of this invention follow from the dependent claims, the following description of embodiments using the drawings, and the drawings themselves.

DETAILED DESCRIPTION OF THE INVENTION

Figure 1:
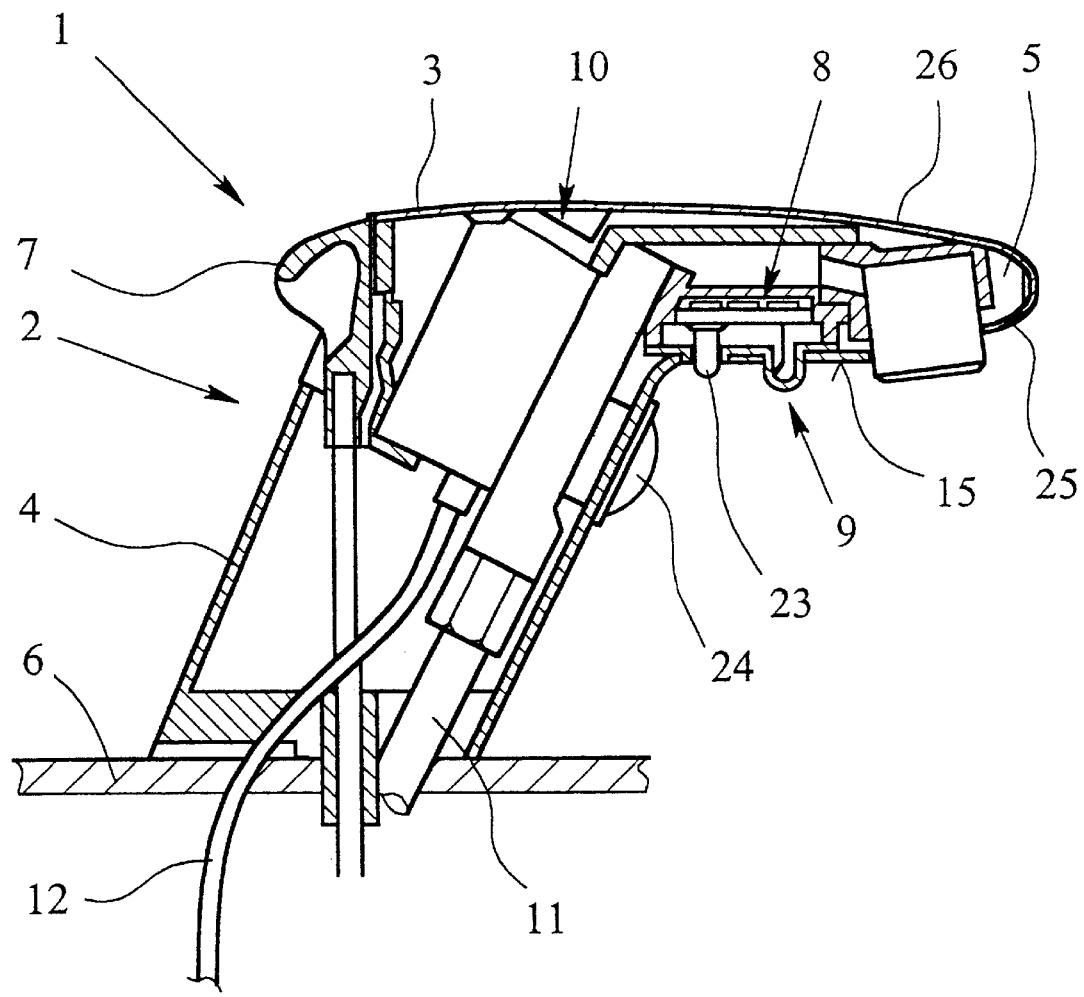
FIG. 1 shows a side cross sectional view of a proximity fixture as claimed in the invention.

The sanitary proximity fixture 1 shown in the figures has a body 2 with a fixture housing 3. The body 2 of the fixture is provided with a fixture base 4 and with a drain arm 5 which runs roughly horizontally. The proximity fixture 1 in the embodiment shown is attached to a wash basin 6 which is not detailed in particular and it has an actuating rod 7 which is guided in the body 2 of the fixture for actuating a drain closer of the wash basin 6 which is not shown.

Furthermore, the sanitary proximity fixture 1 is provided with a control means 8 which in turn has a sensor means 9. The control means 8 is coupled to a valve means 10 which is used to release the cold or hot water or optionally for temperature and for quantity control. The valve means 10 can have a motor-driven valve which is not described in detail for control of the cold and warm water flow and furthermore it can be provided with a thermostat. But it can also use conventional mixing technology with valve disks which are displaced via the corresponding actuators. In any case however the water flow from a cold water and/or a hot water line can be controlled via the valve means 10. FIG. 1 shows simply the cold water line 11.

The control means 8, the sensor means 9 and the valve means 10 are battery-operated here. To do this there is a connection 12 which leads to a battery which is not shown and which is connected accordingly to the valve means 10, and the battery can be located for example in the lower area of the wash basin 6 on its bottom.

The sanitary proximity fixture 1 works in such a way that the control means 8 which is a microprocessor, after acquisition of the signal by the sensor means 9, triggers the valve means 10 to release water. The difference from the prior art consists in that the control means 8 or the sensor means 9 enables direction recognition depending on whether a signal is acquired from one side or the other. This direction recognition in the invention is handled in such a manner that the control means 8, after a signal has been acquired by the sensor means 9 as a body, for example, a hand, approaches from one side, triggers the valve means 10 to release colder water, while the control means 8, after a signal has been acquired when a hand approaches from the other side, triggers the valve means 10 to release warmer water. This basic principle of direction recognition is specifically implemented in the embodiment shown in the Figures such that the control means 8 when acquiring a signal from the right triggers the valve means 10 to open the cold water valve, while the control means 8 when acquiring a signal from the left triggers the valve means 10 to open the cold water valve and a hot water valve to achieve the temperature stipulated to produce the warm water. The cold water valve which is not shown is, like the warm water valve which is not shown, part of the valve means 10.

To ensure proper operation of the sanitary proximity fixture 1 as claimed in the invention, it is provided that the control means 8 is made such that the first valve position of the valve means 10 which is set at first after acquiring the first signal, regardless of the acquisition of signals following thereon, for example in the acquisition of signals from the other side, is maintained for a given first time interval. This ensures that during use the originally set water temperature is not continually adjusted by triggering of other signals.

In terms of handling it is especially advantageous if the first valve position which was set at first is preserved for another given time interval, if shortly before or after the first or another time interval has expired a signal from the sensor means 9 is acquired, regardless of whether this signal is acquired from one side or the other. The control means 8 can preferably be made such that a change of the first valve position is possible by acquiring signals via the sensor means 9 only if the valve or valves of the valve means 10 has or have been reset into the closed position after the first or another time interval has expired.

For proper operation of the sanitary proximity fixture 1 it is furthermore provided that a signal acquired by the sensor means 9 is relayed only then from the control means 8 to the valve means 10 for valve actuation when a stipulated signal threshold value is exceeded. This signal threshold value should be greater than the signal value generated by the water jet during operation of the proximity fixture 1 so that unwanted continuous operation of the proximity fixture 1 by continuous signal triggering as a result of the water jet does not occur.

In one especially simple embodiment of the sensor means 8 it has two sensors 13, 14, of which there is one sensor 13 for acquiring a signal from the right side, and the other sensor 14 is provided to acquire a signal from the left side. The sensors 13, 14 sealed in the body 2 of the proximity fixture 1 are provided in the area of the drain arm 5 on its bottom 15. Attachment of the sensors 13, 14 on the bottom 15 of the drain arm 5 prevents excess fouling of the sensors 13, 14. In addition, the probability of intentional damage of the sensors 13, 14 is largely reduced due to the hidden arrangement.

Figure 2:
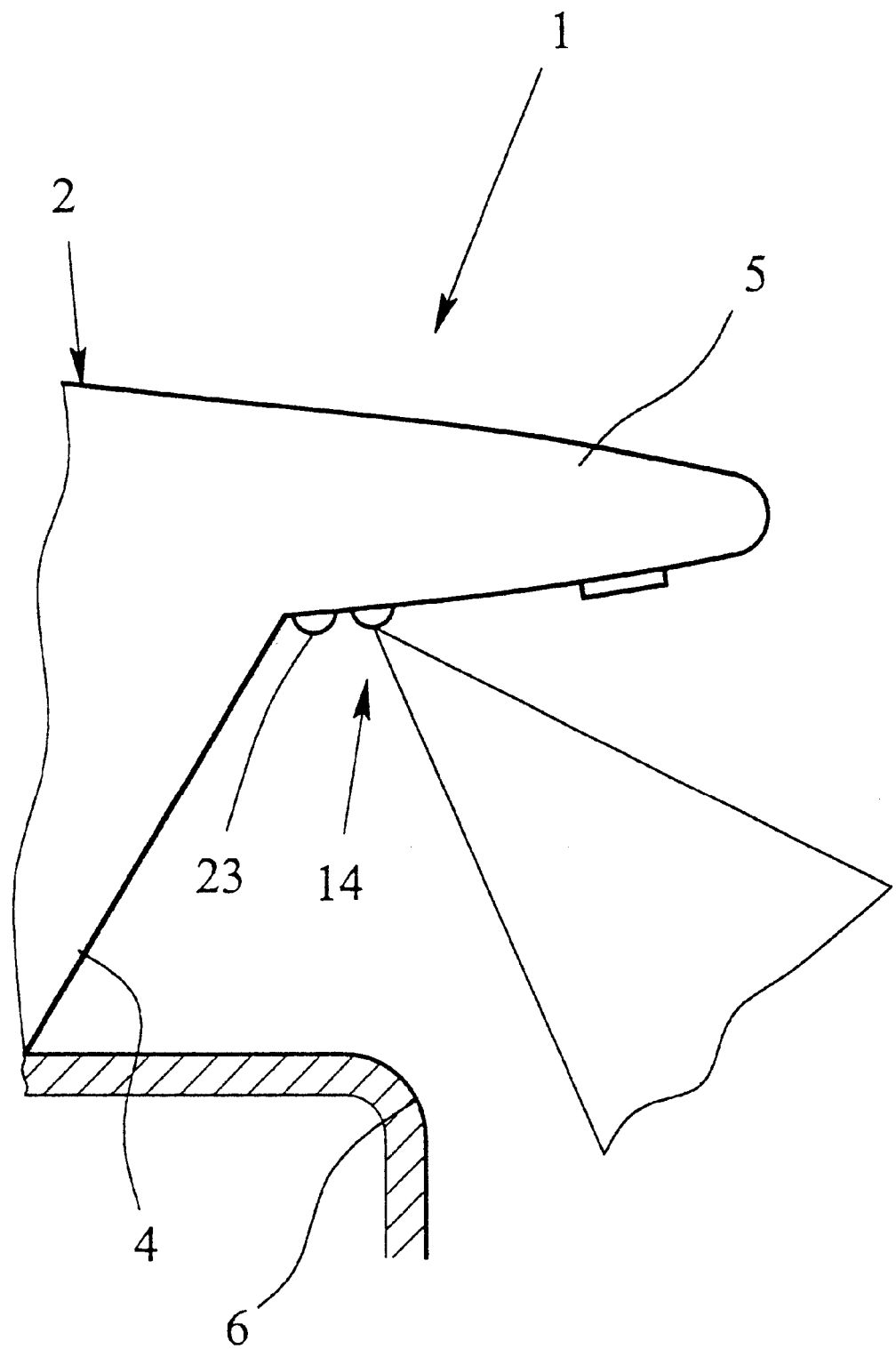
FIG. 2 shows a side view of another embodiment of the proximity fixture as claimed in the invention and FIG. 3 shows a bottom view of the proximity fitting from FIG. 1.

The sensors 13, 14 located on the bottom 15 of the drain arm 5 are arranged pointed downward in the body 2 of the fixture such that in the installation state of the proximity fixture 1 as is shown by way of example in FIG. 2, the wash basin 6 produces a so-called reference signal and the signal is used by the control means 8 for compensation of the relative sensitivity of the sensors 13, 14 among each other. This yields the possibility of obtaining compensation of sensor signals when the proximity fixture 1 is not being used. It has been ascertained that when compensation is not continuously done, it is not possible to keep the activation zones of the sensors 13, 14 for warm and cold at the same site for a longer time. To obtain reliable direction recognition, in the embodiment shown there is the following evaluation of the compensation:

If the sanitary proximity fixture 1 is not being used, the reflection values of the sensor 13 and the sensor 14 are determined continually in time-stipulated, preferably periodic intervals. The signals of the sensors 13, 14 are amplified and are resolved into for example 512 steps by an analog-digital converter of the control means 8. It goes without saying of course that higher but also lower resolution can be used. The signal threshold values for activation of the valve means 10 are established in a fixed ratio to the reflection signals. This factor or this ratio can be for example two. Only those signals which are acquired by the sensor means 9 and are greater by the stipulated ratio than the rest signals lead to activation of the proximity fixture 1.

By continuously renewing the rest signal values of the sensors 13, 14 the operating point for both sides, i.e for the right and left, always remains oriented symmetrically to the center of the sensor means 9. Also, the distance to the drain of the proximity fixture 1 is fixed thereby. Changes in the sensitivity of the individual measurement circuits of cold and warm have no effect. Furthermore, adverse effects caused by drifting of the electronic components, changes of the power supply voltage and fouling of the sensors 13, 14 can be eliminated in this way. When the rest signals deviate from one another too much, an acoustic and/or optical maintenance signal can be delivered via a display means of the proximity fixture 1, the means not being shown in particular.

The sensor means 9 as claimed in the invention is characterized here by an especially simple configuration. In the embodiment shown the sensors 13, 14 are made as infrared sensors, there being two receiving diodes 16, 17 and only one transmitting diode 18 which is located between the receiving diodes 16, 17. The sensor 13 here is formed by the receiving diode 16 and the transmitting diode 18, while the sensor 14 is formed by the receiving diode 17 and the transmitting diode 18.

Figure 3:
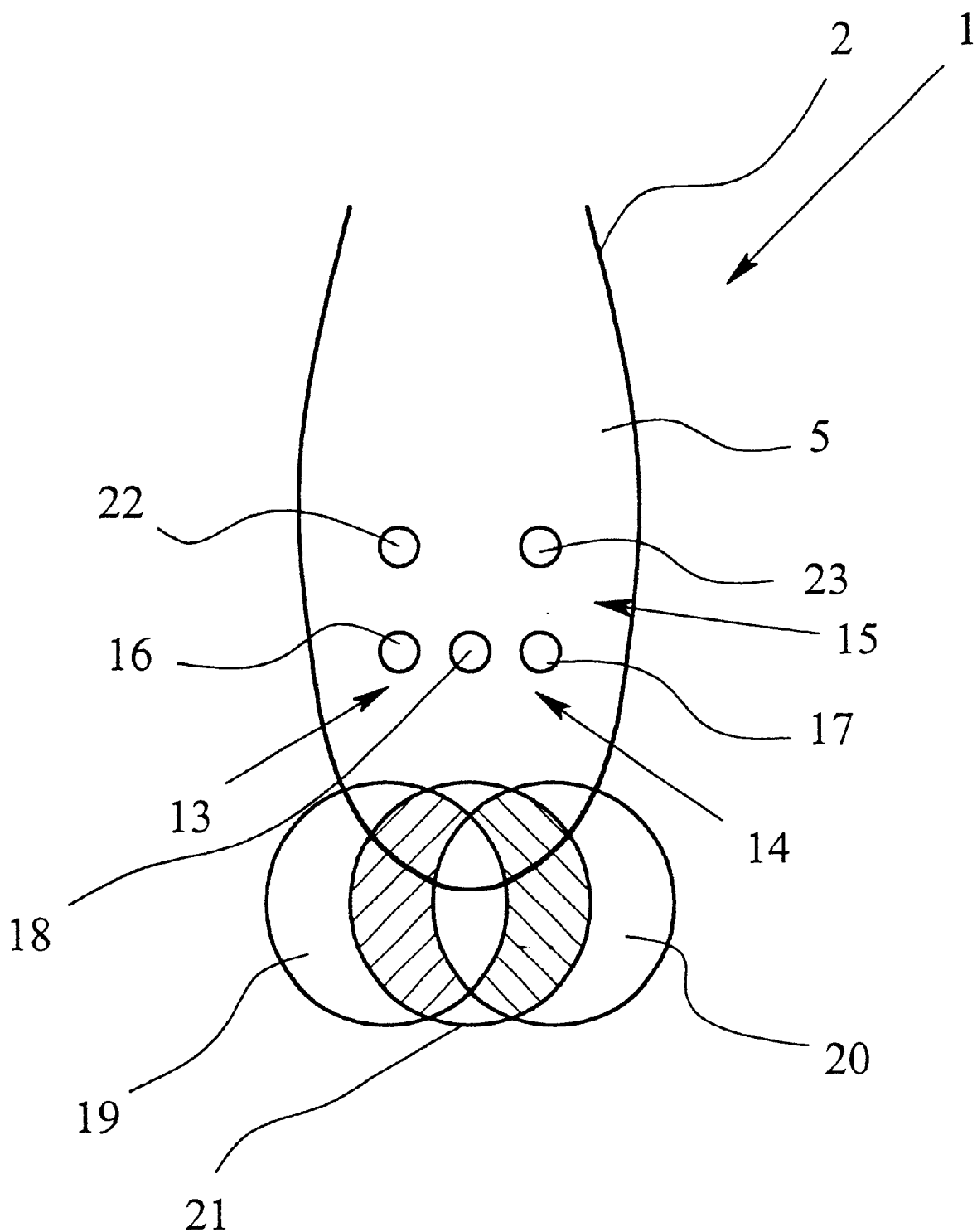

FIG. 3 shows the receiving lobes 19, 20 of the receiving diodes 16, 17 and the transmitting lobes 21 of the transmitting diode 18. In the areas in which the receiving lobes 19, 20 intersect the transmitting lobe 21, acquisition of a signal leads to activation of the sanitary proximity fixture 1 when the signal threshold value is exceeded. Alignment of the receiving diodes 16, 17 projecting from the drain arm 5 and of the transmitting diode 18 should be 45±15° forward such that, as already described, the wash basin 6 is spotlighted and thus the aforementioned rest signals can be used for balancing of the two sensors 13, 14. It should be pointed out that it is of course also possible for the sensors 13, 14 and the receiving diodes 16, 17 and the transmitting diode 18 to be aligned directly downward to the wash basin 6 or for example to the fixture base 4 in order to achieve the above described balancing.

To further improve the ease of handling and control possibilities of the proximity fixture 1, on the body 2 of the fixture and in the area of the sensors 13, 14 there are two controls 22, 23 which are coupled to the control means 8. They are two buttons or pressure switches. The controls 22, 23 are, like the receiving diodes 16, 17 and the transmitting diode 18, located on the bottom 15 of the drain arm 5 and project above the bottom 15. In the same way as the receiving diodes 16, 17 and the transmitting diode 18, they are sealed relative to the drain arm 5. The arrangement of the controls 22, 23 on the bottom of the drain arm 5 yields the same advantages as accrue by the arrangement of the receiving diodes 16, 17 and the transmitting diode 18 on the bottom 15 of the drain arm 5, and to which reference has already been made. Although in this embodiment the controls 22, 23 are located behind the sensors 13, 14 an arrangement in front of the sensors 13, 14 can also be chosen. This has for example the advantage that actuation of the two controls 22, 23 is easily possible without the proximity fixture 1 being activated via the sensor means 9.

The controls 22, 23 are important mainly when using the sanitary proximity fixture 1 in the private domain. When the right-hand control 22 is activated the valve means 10 is triggered to open the cold water valve for a stipulated time interval, while when the left-hand control 23 is activated the valve means 10 is triggered for opening the cold water valve and the hot water valve for a stipulated time interval to obtain warm water of a stipulated temperature. The valve position which has been set by the controls 22, 23 is then deactivated again only when the stipulated time interval, for example one minute, has expired or by actuation thereof or also of the other control 22, 23 within the time interval.

Furthermore, it is provided in this embodiment that with simultaneous activation of the two controls 22, 23 the sensor means 9 is deactivated. Therefore this is important so that when cleaning the wash basin 6 and/or the sanitary proximity fixture 1 the sensor means 9 is prevented from continually responding. After its deactivation the sensor means 9 is automatically re-activated after a given time. Alternatively or in combination it can also be provided that the sensor means 9 is re-activated by activating at least one control 22, 23.

In private use the controls 22, 23 can also be used to operate or activate the proximity fixture 1 if there should be a defect on the sensor means 9.

In the above described sanitary proximity fixture 1 it is such that it has a constant quantitative flow rate, therefore a predetermined amount of water is delivered after activation. The temperature of the warm water has a certain stipulated value. To be able to change both the temperature of the warm water and also the amount there can be one adjusting element each both for temperature setting of the warm water and also for setting the amount of water to be delivered. FIG. 1 shows a temperature setting element 24.

As follows from FIG. 1, the fixture housing 2 is made in two parts; it has a housing part 25 which is open to the top and a cover 26 which can be placed thereon. The two-part execution of the fixture housing 2 has the advantage that it is possible especially easily in this way to place the sensor means 9 and optionally also the control means 8 in the cavity of the drain arm 5. In the case of repair and maintenance this yields good and easy accessibility. Of course it goes without saying that the cover 26 is sealed accordingly relative to the housing part 25 after placement.

Furthermore, in the proximity fixture 1 there can be a display means which is not detailed for display of the set water temperature, it being a good idea to place the corresponding light emitting diodes in the cover 26 or between the cover 26 and the body 2 of the fixture.

The sanitary proximity fixture 1 as claimed in the invention can of course also be used in the nonprivate domain. If control of two temperatures is not desired here, the two sensors can work redundantly and thus can greatly enhance operating reliability. In particular, recognition of sensor problems is possible before the proximity fixture adjusts its operation. Therefore maintenance can be performed at the proper time. In this application exceeded signal threshold values of one or the other sensor always trigger the same temperature.

What is claimed is:

1. Sanitary proximity fixture with an assigned control means which has a sensor means and a valve means which is coupled to the control means, after acquisition of a signal by the sensor means the control means triggering the valve means to release water, wherein the sensor means has at least two sensors including a first sensor for acquiring a signal from one side of the fixture, and a second sensor for acquiring a signal from the other side of the fixture; wherein the control means, after acquisition of a signal from said one side of the fixture, triggers the valve means for release of colder water, while the control means, after acquisition of a signal from the other side of the fixture, triggers the valve means for release of warmer water wherein the control means is made such that the valve position of the valve means which was set at first after acquiring the first signal regardless of the acquisition of other signals in the first time interval is preserved for a given first time interval, wherein the set first valve position is preserved for another given time interval, if shortly before or after the first or another time interval has expired a signal from one side or the other is acquired by the sensor means, and wherein a change of the valve position is possible by acquiring signals via the sensor means only if the valve means has been reset into the closed position after the first or another time interval has expired.

2. Proximity fitting as claimed in claim 1, wherein the at least two sensors are sealed in a body of the proximity fixture and are located at a bottom side of a drain arm.

3. Proximity fitting as claimed in claim 1, wherein the at least two sensors are located pointed downward in a body of the fixture such that in the installation state of the proximity fixture, a wash basin produces a signal which is acquired by the sensor means and which is used by the control means for compensation of the relative sensitivity of the at least two sensors with respect to each other, and wherein balancing of the at least two sensors takes place at stipulated time intervals.

4. Proximity fitting as claimed in claim 1, wherein the at least two sensors are made as infrared sensors and wherein there are two receiving diodes and only one transmitting diode which is located between the receiving diodes.

5. Proximity fitting as claimed in claim 1, wherein two controls are provided on a body of the fixture, in the area of the at least two sensors on a bottom side of the drain arm, said two controls being pressure switches coupled to the control means, and wherein when one control is activated, the valve means is triggered to open cold water valve for a stipulated time interval, while when the other control is activated the valve means is triggered for opening at least a hot water valve.

6. Proximity fitting as claimed in claim 5, wherein by actuating one of said two controls within the time interval, the valve means is reset into the closed position.

7. Proximity fitting as claimed in claim 5, wherein with simultaneous activation of the two controls the sensor means is deactivated and wherein, after deactivation of the sensor means, the sensor means can be turned on again after a stipulated time interval or by actuating at least one control.

8. Proximity fitting as claimed in claim 1, wherein there is at least one other control, said at least one other control being a switch for setting at least one of the amount of water and the temperature of the warm water.

9. Proximity fitting as claimed in claim 1, wherein a fixture housing is made in at least two parts including a housing part which is open to the top and a cover which can be placed thereon, and wherein the sensor means and the control means are located in a drain arm.

10. Proximity fitting as claimed in claim 1, wherein there is a display means which has light-emitting diodes for display of the set water temperature.

11. Proximity fitting as claimed in claim 1, wherein the control means is made such that the valve position of the valve means which was set at first after acquiring the first signal regardless of the acquisition of other signals in the first time interval is preserved for a given time interval, if shortly before or after the first or another time interval has expired a signal from one side is acquired by the sensor means, and wherein a change of the valve position is possible by acquiring signals via the sensor means only if the valve means has been reset into the closed position after the first or another time interval has expired.

12. Proximity fitting as claimed in claim 2, wherein the sensors are located pointed downward in the body of the fixture such that, in the installation state of the proximity fixture the wash basin produces a signal which is acquired by the sensor means and which is used by the control means for compensation of the relative sensitivity of the at least two sensors relative to each other, and wherein balancing of the at least two sensors takes place at stipulated time intervals.

13. Proximity fitting as claimed in claim 6, wherein with simultaneous activation of the two controls the sensor means is deactivated and wherein, after deactivation of the sensor means, the sensor means can be turned on again after a stipulated time interval or by actuating at least one control.

14. Sanitary proximity fixture with an assigned control means which has a sensor means and a valve means which is coupled to the control means, after acquisition of a signal by the sensor means the control means triggering the valve means to release water, wherein the sensor means has at least two sensors, including a first sensor for acquiring a signal from one side of the fixture, and a second sensor for acquiring a signal from the other side of the fixture; wherein the control means, after acquisition of a signal from said one side of the fixture, triggers the valve means for release of colder water, while the control means, after acquisition of a signal from the other side of the fixture, triggers the valve means for release of warmer water; and wherein a signal acquired by the sensor means is relayed from the control means to the valve means for the valve actuation only when a stipulated signal threshold value is exceeded, and the signal threshold value is greater than the signal value generated by the water jet of a proximity figure.

15. Proximity fitting as claimed in claim 14, wherein the at least two sensors are sealed in a body of the proximity fixture and are located at a bottom side of a drain arm.

16. Proximity fitting as claimed in claim 14, wherein the at least two sensors are located pointed downward in a body of the fixture such that, in the installation state of the proximity fixture, a wash basin produces a signal which is acquired by the sensor means and which is used by the control means for compensation of the relative sensitivity of the sensors with respect to each other, and wherein balancing of the at least two sensors takes place at stipulated time intervals.

17. Proximity fitting as claimed in claim 14, wherein the at least two sensors are made as infrared sensors and wherein there are two receiving diodes and a transmitting diode located between the two receiving diodes.

18. Proximity fitting as claimed in claim 14, wherein two controls are provided on a body of the fixture, in the area of the at least two sensors on a bottom side of the drain arm, said two controls being pressure switches coupled to the control means, and wherein when one control is activated, the valve means is triggered to open a cold water valve for a stipulated time interval, while when the other control is activated the valve means is triggered for opening at least a hot water valve.

19. Proximity fitting as claimed in claim 18, wherein by actuating one of said two controls within the time interval, the valve means is reset into the closed position.

20. Proximity fitting as claimed in claim 18, wherein with simultaneous activation of the two controls the sensor means is deactivated and wherein, after deactivation of the sensor means, the sensor means can be turned on again after a stipulated time interval or by actuating at least on e control.

21. Proximity fitting as claimed in claim 14, further comprising a third control, including a switch for setting at least one of the amount of water and the temperature of the warm water.

22. Proximity fitting as claimed in claim 14, wherein a fixture housing is made in at least two parts including a housing part which is open to the top and a cover which can be placed thereon, and wherein the sensor means and the control means are located in a drain arm.

23. Proximity fitting as claimed in claim 14, further comprising a display means including light-emitting diodes for displaying the set water temperature.

24. Proximity fitting as claimed in claim 14, wherein the control means is made such that the valve position of the valve means which was set at first after acquiring the first signal regardless of the acquisition of other signals in the first time interval is preserved for a given time interval, if shortly before or after the first or another time interval has expired a signal from one side is acquired by the sensor means, and wherein a change of the valve position is possible by acquiring signals via the sensor means only if the valve means has been reset into the closed position after the first or another time interval has expired.

25. Proximity fitting as claimed in claim 15, wherein the at least two sensors are located so as to point downwardly in the body of the fixture such that, in the installation state of the proximity fixture, the wash basin produces a signal which is acquired by the sensor means and which is used by the control means for compensation of the relative sensitivity of the at least two sensors relative to each other, and wherein balancing of the at least two sensors takes place at stipulated time intervals.

26. Proximity fitting as claimed in claim 19, wherein with simultaneous activation of the two controls the sensor means is deactivated and wherein, after deactivation of the sensor means, the sensor means can be turned on again after a stipulated time interval or by actuating at least one control.

* * * * *